Sept. 27, 1966     L. G. KILMER ETAL     3,275,770
EXPLOSION PRESSURE RESPONSIVE SWITCH
Filed Feb. 26, 1965
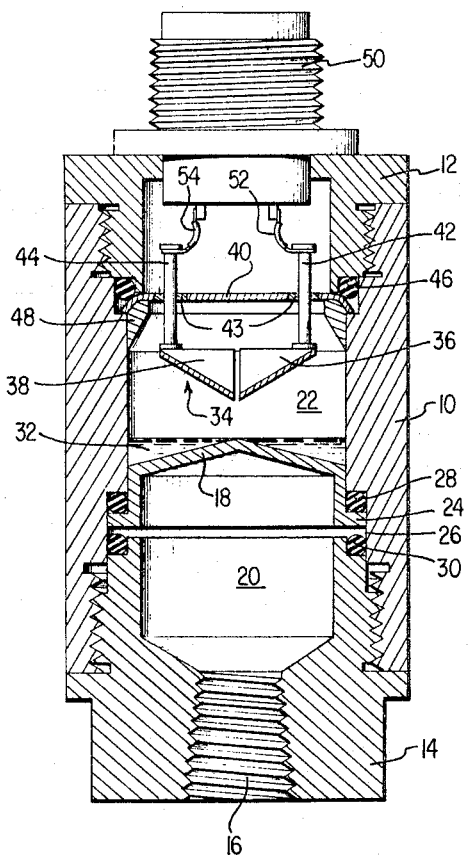
INVENTORS.
LAUREN G. KILMER
RICHARD K. SHEARMAN
BY McLean, Morton and Boustead
ATTORNEYS.

3,275,770
EXPLOSION PRESSURE RESPONSIVE SWITCH
Lauren G. Kilmer and Richard K. Shearman, Tulsa, Okla., assignors, by mesne assignments, to Sinclair Research, Inc., New York, N.Y., a corporation of Delaware
Filed Feb. 26, 1965, Ser. No. 435,450
6 Claims. (Cl. 200—82)

The present invention relates to an electric switch and more particularly to a dual purpose switch which provides a reliable means for detecting an explosion in, for example, a gas filled chamber to prevent the double filling of the chamber without exploding between fills.

The present invention is particularly useful in sources for seismic waves such as described in copending applications Serial No. 187,111, filed April 12, 1962, now Patent No. 3,235,027, and Serial No. 314,230, filed October 7, 1963. The devices of these copending applications use a gas explosion confined in a vertically expansible chamber at the lowermost portion, the chamber has a pressure plate of considerable area which transmits the force of the explosion to the land, air or water medium to be seismically explored. Surmounting the expandible chamber is a dead weight of substantial mass. The explosion or violent combustion of a gas mixture produces a shock wave which ordinarily would be transmitted equally in all directions; however, the great inertia of the dead weight surmounting the chamber and the lateral rigidity of the walls of the chamber direct the major portion of the force of the explosion downwardly against the pressure plate, thus causing a substantial movement of the plate, which as mentioned, is of considerable area. The force of the explosion thus applies compressive strength quickly at the interface beneath the chamber to initiate a seismic wave. The frequency of detonation within the expansible chamber is arranged, in coordination with the size of the pressure plate, to give sound pulses of the desired frequency. The combustion gas mixture usually includes air or oxygen mixed with a combustion gas such as propane, propylene, ethylene, acetylene, etc. In these devices successive actuations of the energy sources are made to permit summation of seismic recordings, etc. There is a requirement in these devices, however that a reliable means be available to detect each explosion as it occurs to prevent the double filling of the chamber without exploding between fills.

It is an object of this invention to provide a switch useful as a means for detecting each explosion and preventing double filling of the chamber. In general, the switch of this invention is a dual purpose device which uses the energy of the explosion gases and the acceleration of the chamber to lift mercury in a cavity and cause the same to flow through a gap between two electrodes and give momentary electrical contact in a circuit which can, for example, control the apparatus for filling the chamber.

This invention will be better understood from the accompanying drawing wherein the sole figure is a cross-sectional view of a switch constructed in accordance with this invention.

Referring now to the drawing, the device includes a hollow body 10 which has an upper plug 12 and a lower plug 14 screwed into the two ends thereof. The lower plug 14 has a passage 16 which is adapted to be screwed onto a tube in communication with explosion chamber manifold (not shown) and which allows the ingress of combustion gas from the manifold into the hollow of body 10. A piston 18 which is slideably arranged in body 10 divides the hollow of the body into a lower chamber 20 and an upper chamber 22. The piston 18 has a lip 24 which extends into recess 26 formed in the wall of body 10. O-rings 28 and 30 seal lip 24 in recess 26. A small supply of mercury 32 is carried by piston 18 on its top side.

The design of the piston 18 is such that mercury 32 collects in a ring around the edge of the piston. A split cone electrode means, generally designated 34, is arranged above piston 18 in chamber 22. The electrode means include parts 36 and 38 which are attached by pins or terminal elements 42 and 44 and wires 52 and 54 to an electrical plug 50 secured to upper plug 12. Elements 42 and 44 are supported by closure plate 40 which forms the upper end of chamber 22. Plate 40 can be an electrically nonconductive material although preferably it is metal with glass seals 43 around elements 42 and 44. Plug 50 is adapted to be connected to a power supply chassis.

In operation, the switch is actuated by the high-pressure gas from the manifold (not shown) which passes through passage 16 into body 10 and forces the piston 18 to move upward in the recess 26 and throw a spray of mercury 32 upward. The mercury 32 strikes the deflector ring 48 and is deflected toward the center of chamber 22 where it drops into the top of split cone electrode 34 between parts 36 and 38. As the mercury runs out of the cone electrode 34 through the slit between parts 36 and 38, it completes an electrical connection between the two parts from the power supply (not shown) by way of plug 50, wire 52, element 42, part 36, mercury 32, part 38, element 44, wire 54 and plug 50. In being attached to the manifold of the explosion chamber which receives high acceleration, the mercury is also thrown upward by that movement and makes a primary or secondary contact so that there is great reliability in the operation of this switch.

It is claimed:
1. A switch comprising a hollow body, plate means sealing the top of the hollow of said body, the hollow of said body having a sidewall, a split cone electrode means including two electrically-conductive elements supported in the hollow of said body beneath said plate, said elements being spaced a small distance apart, means for sealing the bottom of said hollow including a piston arranged at the bottom of said hollow body, said piston having limited axial movement in the hollow of said body, a small body of mercury normally resting on said piston means beneath said plate, and deflector means adjacent said electrode means for deflecting mercury which strikes the same substantially axially of said body in the direction toward said electrode means, whereby when a sudden force is applied at the bottom of said hollow body said piston means is suddenly raised to throw said mercury upward where it is deflected to pass between said two elements and momentarily complete a circuit through said electrode means.

2. The switch of claim 1 wherein said piston has a conically shaped portion, said mercury collecting in a ring around the edge thereof.

3. The switch of claim 1 wherein said deflector means is an annular element having a conically shaped lower surface arranged above said two elements.

4. The switch of claim 3 wherein said piston has a conically shaped portion, said mercury collecting in a ring around the edge thereof.

5. The switch of claim 4 wherein said means for sealing the bottom includes an annular flange on said piston extending into an annular recess in the sidewall of said body and further including means arranged on each side of said flange in said body to seal said piston element with respect to said sidewall.

6. The switch of claim 5 wherein said electrode means includes an electric plug secured to the top of said body and an electrically conductive terminal element supporting each one of said two elements on said plate and means electrically connecting said terminal elements to said plug.

References Cited by the Examiner

UNITED STATES PATENTS

| 965,549 | 7/1910 | Young | 200—152 X |
| 2,816,196 | 12/1957 | Daudelin | 200—82 X |
| 2,931,874 | 4/1960 | Leaman | 200—82 X |

BERNARD A. GILHEANY, *Primary Examiner.*

H. M. FLECK, *Assistant Examiner.*